US012757193B2

(12) United States Patent
Xiao et al.

(10) Patent No.: US 12,757,193 B2
(45) Date of Patent: Oct. 6, 2026

(54) METHODS AND APPARATUSES FOR MULTI-TRP TRANSMISSION

(71) Applicant: Lenovo (Beijing) Limited, Beijing (CN)

(72) Inventors: Lingling Xiao, Beijing (CN); Bingchao Liu, Beijing (CN); Chenxi Zhu, Fairfax, VA (US); Wei Ling, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 316 days.

(21) Appl. No.: 18/258,245

(22) PCT Filed: Dec. 25, 2020

(86) PCT No.: PCT/CN2020/139500
§ 371 (c)(1),
(2) Date: Jun. 19, 2023

(87) PCT Pub. No.: WO2022/134022
PCT Pub. Date: Jun. 30, 2022

(65) Prior Publication Data
US 2024/0057075 A1 Feb. 15, 2024

(51) Int. Cl.
*H04W 72/00* (2023.01)
*H04L 1/1812* (2023.01)
(Continued)

(52) U.S. Cl.
CPC ....... *H04W 72/1268* (2013.01); *H04L 1/1812* (2013.01); *H04W 72/232* (2023.01)

(58) Field of Classification Search
None
See application file for complete search history.

(56) References Cited

U.S. PATENT DOCUMENTS

2019/0349964 A1* 11/2019 Liou .................. H04W 72/046
2020/0100279 A1* 3/2020 Al-Imari .............. H04W 48/16
(Continued)

FOREIGN PATENT DOCUMENTS

CN 111226480 A 6/2020
CN 111869302 A 10/2020
(Continued)

OTHER PUBLICATIONS

Apple Inc., "Remaining Issues on Multi-TRP Enhancement", 3GPP TSG RAN WG1 #99, R1-1912823, Reno, USA [retrieved May 23, 2023]. Retrieved from the Internet <https://www.3gpp.org/ftp/tsg_ran/WG1_RL1/TSGR1_99/Docs>>, Nov. 2019, 10 Pages.
(Continued)

*Primary Examiner* — Brandon M Renner
(74) *Attorney, Agent, or Firm* — FIG. 1 Patents

(57) ABSTRACT

Embodiments of the present disclosure relate to a method and apparatus for multiple transmit-receive points (multi-TRP) transmission. According to an embodiment of the present disclosure, a method can include: receiving at least two configured grant (CG) configurations in a bandwidth part (BWP); receiving association information for associating the at least two CG configurations; and transmitting one or more repetitions of a transport block (TB) on one or more physical uplink shared channel (PUSCH) transmission occasions from each CG configuration of the at least two CG configurations based on the association information. Embodiments of the present disclosure can support the TB transmitted toward multi-TRP according to the multiple CG configurations.

20 Claims, 10 Drawing Sheets

(51) Int. Cl.

| | |
|---|---|
| ***H04W 72/1268*** | (2023.01) |
| ***H04W 72/232*** | (2023.01) |

(56) References Cited

U.S. PATENT DOCUMENTS

| | | | | |
|---|---|---|---|---|
| 2020/0154469 | A1* | 5/2020 | Chin | H04L 1/1822 |
| 2021/0144743 | A1* | 5/2021 | Rastegardoost | H04W 72/23 |
| 2022/0007411 | A1* | 1/2022 | Takeda | H04W 72/23 |
| 2022/0086891 | A1* | 3/2022 | Baek | H04W 72/23 |
| 2022/0217760 | A1* | 7/2022 | Iyer | H04L 1/1854 |
| 2022/0232589 | A1* | 7/2022 | Yang | H04L 5/0044 |
| 2022/0239431 | A1* | 7/2022 | Okamura | H04W 52/367 |
| 2022/0377596 | A1* | 11/2022 | Kuo | H04L 69/324 |
| 2025/0150988 | A1* | 5/2025 | Lim | H04L 5/0094 |
| 2026/0020020 | A1 | 1/2026 | Xiao et al. | |

FOREIGN PATENT DOCUMENTS

| | | | | |
|---|---|---|---|---|
| WO | WO-2019244207 A1 * | 12/2019 | | H04B 7/022 |
| WO | WO-2020252174 A1 * | 12/2020 | | H04W 72/23 |

OTHER PUBLICATIONS

PCT/CN2020/139500 , "International Preliminary Report on Patentability", PCT Application No. PCT/CN2020/139500, Jul. 6, 2023, 6 pages.

PCT/CN2020/139500 , "International Search Report and Written Opinion", PCT Application No. PCT/CN2020/139500, Aug. 27, 2021, 7 pages.

Sony , "Remaining issues on configured grant enhancement for NR-U", 3GPP TSG RAN WG1 #100bis, R1-2001814, eMeeting [retrieved May 23, 2023]. Retrieved from the Internet <https://www.3gpp.org/ftp/tsg_ran/WG1_RL1/TSGR1_100b_e/Docs>., Apr. 2020, 3 Pages.

* cited by examiner

```
ConfiguredGrantConfig::=                         SEQUENCE {
    frequencyHopping                             ENUMERATED {intraSlot, interSlot}          OPTIONAL, -- Need S
    cg-DMRS-Configuration                        DMRS-UplinkConfig,
    …
    harq-ProcID-Offset-r16                       INTEGER (0..15)                            OPTIONAL, -- Need M
    harq-ProcID-Offset2-r16                      INTEGER (0..15)                            OPTIONAL, -- Need M
    configuredGrantConfigIndex-r16               ConfiguredGrantConfigIndex-r16             OPTIONAL, -- Cond CG-List
    configuredGrantConfigIndexMAC-r16            ConfiguredGrantConfigIndexMAC-r16          OPTIONAL, -- Cond CG-List
    associatedconfiguredGrantConfigIndex         ConfiguredGrantConfigIndex-r16             OPTIONAL, -- Cond CG-List
        …
   phy-PriorityIndex-r16 ENUMERATED {p0, p1} OPTIONAL, -- Need R
}
```

FIG. 4

```
BWP-OplinkDedicated::=                          SEQUENCE {
    ...
    configuredGrantConfigToAddModList-r16              ConfiguredGrantConfigToAddModList-r16              OPTIONAL, -- Need N
    configuredGrantConfigToReleaseList-r16             ConfiguredGrantConfigToReleaseList-r16             OPTIONAL, -- Need N
    configuredGrantConfigType2DeactivationStateList-r16  ConfiguredGrantConfigType2DeactivationStateList-r16  OPTIONAL -- Need R
    ConfiguredGrantActivationStateList                 ConfiguredGrantActivationStateList                 OPTIONAL -- Need K
}
ConfiguredGrantConfigToAddModList-r16  ::= SEQUENCE (SIZE (1..maxNrofConfiguredGrantConfig-r16)) OF ConfiguredGrantConfig
ConfiguredGrantConfigToReleaseList-r16 ::= SEQUENCE (SIZE (1..maxNrofConfiguredGrantConfig-r16)) OF ConfiguredGrantConfigIndex-r16
ConfiguredGrantConfigType2DeactivationState-r16 ::= SEQUENCE (SIZE (1..maxNrofConfiguredGrantConfig-r16)) OF
                            ConfiguredGrantConfigIndex-r16
ConfiguredGrantConfigType2DeactivationStateList-r16 ::=
                            SEQUENCE (SIZE (1..maxNrofCG-Type2DeactivationState)) OF ConfiguredGrantConfigType2DeactivationState-r16
ConfiguredGrantActivationState::= SEQUENCE (SIZE (1..maxNrofConfiguredGrantConfig-r16)) OF ConfiguredGrantConfigIndex-r16
ConfiguredGrantActivationStateList::=SEQUENCE (SIZE (1..mazNrofCG-ActivationState)) OF ConfiguredGrantActivationState
```

FIG. 5

```
ConfiguredGrantConfig::=                    SEQUENCE {
    …
    SRS-ResourceSetId                       SRS-ResourceSetId          OPTIONAL, -- Cond CG-List
    rrc-ConfiguredUplinkGrant SEQUENCE {
        …
    srs-ResourceIndicator                   INTEGER (0..15)            OPTIONAL, -- Need R

    }
```

FIG. 11

```
ConfiguredGrantConfig::=                          SEQUENCE {
    …
    rrc-ConfiguredUplinkGrant SEQUENCE {
    coresetPoolIndex-r16                          INTEGER (0..1)                    OPTIONAL, -- Need S

        …
    }
    …
}
```

FIG. 12

METHODS AND APPARATUSES FOR MULTI-TRP TRANSMISSION

TECHNICAL FIELD

Embodiments of the present application generally relate to wireless communication technology, and in particular to a method and an apparatus for multiple transmit-receive point (multi-TRP) transmission.

BACKGROUND

Multi-TRP transmission has been introduced into New Radio (NR). In NR Rel-17, it is proposed to identify and specify features to improve reliability and robustness for channels besides a physical downlink shared channel (PDSCH), e.g., physical downlink control channel (PDCCH), physical uplink shared channel (PUSCH), and physical uplink control channel (PUCCH), using multiple TRPs and/or multi-panel, with Rel-17 reliability features. Specifically, transmitting a PUSCH towards multiple TRPs based on configured grant (CG) is an important method to improve PUSCH reliability in Rel-17.

There are two methods that may be used to implement the CG based PUSCH transmission. One method is transmitting the repetitions of a transport block (TB) towards multiple TRPs on multiple PUSCH transmission occasions from a single CG configuration. Another method is transmitting the repetitions of a TB towards multiple TRPs on multiple PUSCH transmission occasions from multiple CG configurations.

To better support the latter method, some problems, e.g., how to associate the multiple CG configurations, how to transmit the TB based on the multiple CG configurations, how to determine the sounding reference signal (SRS) resources for the multiple CG configurations, how to ensure the same HARQ process for the multiple CG configurations, etc., need to be addressed.

Given the above, it is desirable to provide improved technology for multi-TRP transmission, so as to better support the TB transmitted toward multiple TRPs according to the multiple CG configurations.

SUMMARY OF THE APPLICATION

Some embodiments of the present application provide a technical solution for multi-TRP transmission.

According to some embodiments of the present application, a method may include: receiving at least two CG configurations in a bandwidth part (BWP); receiving association information for associating the at least two CG configurations; and transmitting one or more repetitions of a TB on one or more PUSCH transmission occasions from each CG configuration of the at least two CG configurations based on the association information.

In some embodiments, one CG configuration of the at least two CG configurations includes index(es) of remaining CG configuration(s) of the at least two CG configurations. In an embodiment of the present application, the method may further include: receiving downlink control information (DCI) for activating the at least two CG configurations, wherein the DCI includes a hybrid automatic repeat request (HARQ) process number (HPN) which has the same value as an index of the one CG configuration.

In some embodiments, the association information includes an association CG configuration list containing one or more association states, and one association state of the one or more association states includes indexes of the at least two CG configuration. In an embodiment of the present application, the method may further include: receiving DCI for activating the at least two CG configurations, wherein the DCI includes an HPN which indicates an entry in the association CG configuration list corresponding to the one association state.

In some embodiments, the association information is indicated by a medium access control (MAC) control element (CE) command. In an embodiment of the present application, indexes of the at least two CG configurations are included in a same octet of the MAC CE.

In some embodiments, each CG configuration of the at least two CG configurations includes a slot offset within a periodicity of the at least two CG configurations. In an embodiment of the present application, the one or more PUSCH transmission occasions from each CG configuration of the at least two CG configurations are non-overlapped in time domain due to the slot offset of each CG configuration.

In some embodiments, one or more PUSCH transmission occasions from each CG configuration of the at least two CG configurations are concatenated according to an order of CG configuration. In an embodiment of the present application, a start slot of the first PUSCH transmission occasion from a succeeding CG configuration equals to an end slot of the last PUSCH transmission occasion from a preceding CG configuration plus one.

In some embodiments, each CG configuration of the at least two CG configurations includes a first number of consecutive repetitions of the TB transmitted according to the corresponding CG configuration, and the at least one CG configuration includes a second number of total repetitions of the TB. In an embodiment of the present application, the method may further include: transmitting the first number consecutive repetitions of the TB on the first number of PUSCH transmission occasions from each CG configuration according to an order of CG configuration; repeating the transmitting until the second number of total repetitions is reached.

In some embodiments, each CG configuration of the at least two CG configurations includes a first number of total repetitions of the TB transmitted according to the corresponding CG configuration and a second number of consecutive repetitions of the TB transmitted according to the corresponding CG configuration. In an embodiment of the present application, the method may further include: transmitting the second number of consecutive repetitions of the TB on the second number of PUSCH transmission occasions from each CG configuration for which the first number of total repetitions of the TB is not reached according to an order of CG configuration, wherein the order of CG configuration is determined based on all CG configuration(s) of the at least two CG configurations for which the first number of total repetitions of the TB is not reached; and repeating the transmitting until the first number of total repetitions of the TB included in each CG configuration is reached.

In some embodiments, a time duration for all repetitions of the TB is less than or equal to a time duration derived by a periodicity of the at least two CG configurations.

In some embodiments, each CG configuration of the at least two CG configurations includes a sounding reference signal (SRS) resource indicator (SRI), and the SRI includes at least one bit indicating an SRS resource set used for transmitting the one or more repetitions of the TB according to the corresponding CG configuration.

In some embodiments, the method may further include: receiving DCI indicating at least one SRI, wherein each of the at least one SRI includes at least one bit indicating an SRS resource set used for transmitting the one or more repetitions of the TB according to each CG configuration of the at least two CG configurations.

In some embodiments, each CG configuration of the at least two CG configurations includes an SRS resource set index for indicating an SRS resource set used for transmitting the one or more repetitions of the TB according to the corresponding CG configuration.

In some embodiments, each CG configuration of the at least two CG configurations includes a control resource set (CORESET) pool index, wherein the CORESET pool index is associated with an SRS resource set used for transmitting the one or more repetitions of the TB according to the corresponding CG configuration.

In some embodiments, the at least two CG configurations have a same HARQ process ID.

In an embodiment of the present application, the HARQ process ID is determined based on a first symbol of a first PUSCH transmission occasion of a CG configuration with a lowest index among the at least two CG configurations.

In another embodiment of the present application, the HARQ process ID is determined based on an earliest start symbol of all PUSCH transmission occasions from the at least two CG configurations.

In yet another embodiment of the present application, the HARQ process ID is determined to be a lowest HARQ process ID among all HARQ process IDs calculated based on the at least two CG configurations.

In some embodiments, all repetitions of the TB have a same TB size.

In an embodiment of the present application, the TB size is determined based on a number of resource blocks (RBs) corresponding to a first PUSCH transmission occasion of all PUSCH transmission occasions from the at least two CG configurations.

In another embodiment of the present application, the TB size is determined based on a number of RBs corresponding to a PUSCH transmission occasion of a CG configuration with a lowest index among the at least two CG configurations.

In yet another embodiment of the present application, the TB size is determined to be a smallest TB size among all TB size calculated based on the at least two CG configurations.

In some embodiments, the at least two CG configurations have a same periodicity and a same number of HARQ processes.

In some embodiments, the at least two CG configurations have a same number of transmission layers.

In some embodiments, the at least two CG configurations have a same priority and a same PUSCH repetition type.

According to some embodiments of the present application, a method may include: transmitting at least two CG configurations in a BWP; transmitting association information for associating the at least two CG configurations; and receiving one or more repetitions of a TB on one or more PUSCH transmission occasions from each CG configuration of the at least two CG configurations based on the association information.

In some embodiments, one CG configuration of the at least two CG configurations includes index(es) of remaining CG configuration(s) of the at least two CG configurations. In an embodiment of the present application, the method may further include: transmitting DCI for activating the at least two CG configurations, wherein the DCI includes an HPN which has the same value as an index of the one CG configuration.

In some embodiments, the association information includes an association CG configuration list containing one or more association states, and one association state of the one or more association states includes indexes of the at least two CG configurations. In an embodiment of the present application, the method may further include: transmitting DCI for activating the at least two CG configurations, wherein the DCI includes an HPN which indicates an entry in the association CG configuration list corresponding to the one association state.

In some embodiments, the association information is indicated by a MAC CE command. In an embodiment of the present application, indexes of the at least two CG configurations are included in a same octet of the MAC CE.

In some embodiments, each CG configuration of the at least two CG configurations includes a slot offset within a periodicity of the at least two CG configurations. In an embodiment of the present application, the one or more PUSCH transmission occasions from each CG configuration of the at least two CG configurations are non-overlapped in time domain due to the slot offset of each CG configuration.

In some embodiments, one or more PUSCH transmission occasions from each CG configuration of the at least two CG configurations are concatenated according to an order of CG configuration. In an embodiment of the present application, a start slot of the first PUSCH transmission occasion from a succeeding CG configuration equals to an end slot of the last PUSCH transmission occasion from a preceding CG configuration plus one.

In some embodiments, each CG configuration of the at least two CG configuration includes a first number of consecutive repetitions of the TB transmitted according to the corresponding CG configuration, and the at least one CG configuration includes a second number of total repetitions of the TB. In an embodiment of the present application, the method may further include: receiving the first number of consecutive repetitions of the TB on the first number of PUSCH transmission occasions from each CG configuration according to an order of CG configuration; repeating the receiving until the second number of total repetitions is reached.

In some embodiments, each CG configuration of the at least two CG configurations includes a first number of total repetitions of the TB transmitted according to the corresponding CG configuration and a second number of consecutive repetitions of the TB transmitted according to the corresponding CG configuration. In an embodiment of the present application, the method may further include: receiving the second number of consecutive repetitions of the TB on the second number of PUSCH transmission occasions from each CG configuration for which the first number of total repetitions of the TB is not reached according to an order of CG configuration, wherein the order of CG configuration is determined based on all CG configuration(s) of the at least two CG configurations for which the first number of total repetitions of the TB is not reached; and repeating the receiving until the first number of total repetitions of the TB included in each CG configuration is reached.

In some embodiments, a time duration for all repetitions of the TB is less than or equal to a time duration derived by a periodicity of the at least two CG configurations.

In some embodiments, each CG configuration of the at least two CG configurations includes an SRI, and the SRI includes at least one bit indicating an SRS resource set used for receiving the one or more repetitions of the TB according to the corresponding CG configuration.

In some embodiments, the method may further include: transmitting DCI indicating at least one SRI, wherein each of the at least one SRI includes at least one bit indicating an SRS resource set used for receiving the one or more repetitions of the TB according to each CG configuration of the at least two CG configurations.

In some embodiments, each CG configuration of the at least two CG configurations includes an SRS resource set index for indicating an SRS resource set used for receiving the one or more repetitions of the TB according to the corresponding CG configuration.

In some embodiments, each CG configuration of the at least two CG configurations includes a CORESET pool index, wherein the CORESET pool index is associated with an SRS resource set used for receiving the one or more repetitions of the TB according to the corresponding CG configuration.

In some embodiments, the at least two CG configurations have a same HARQ process ID.

In an embodiment of the present application, the HARQ process ID is determined based on a first symbol of a first PUSCH transmission occasion of a CG configuration with a lowest index among the at least two CG configurations.

In another embodiment of the present application, the HARQ process ID is determined based on an earliest start symbol of all PUSCH transmission occasions from the at least two CG configurations.

In yet another embodiment of the present application, the HARQ process ID is determined to be a lowest HARQ process ID among all HARQ process IDs calculated based on the at least two CG configurations.

In some embodiments, all repetitions of the TB have a same TB size.

In an embodiment of the present application, the TB size is determined based on a number of RBs corresponding to a first PUSCH transmission occasion of all PUSCH transmission occasions from the at least two CG configurations.

In another embodiment of the present application, the TB size is determined based on a number of RBs corresponding to a PUSCH transmission occasion of a CG configuration with a lowest index among the at least two CG configurations.

In yet another embodiment of the present application, the TB size is determined to be a smallest TB size among all TB sizes calculated based on the at least two CG configurations.

In some embodiments, the at least two CG configurations have a same periodicity and a same number of HARQ processes.

In some embodiments, the at least two CG configurations have a same number of transmission layers.

In some embodiments, the at least two CG configurations have a same priority and a same PUSCH repetition type.

Some embodiments of the present application also provide an apparatus, including: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a technical solution for multi-TRP transmission, so as to better support the TB transmitted toward multi-TRP according to the multiple CG configurations, thereby realizing reliability and robustness of the PUSCH transmission in the multi-TRP transmission.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 4 illustrates an exemplary CG configuration information element (IE) according to some embodiments of the present application;

FIG. 5 illustrates an exemplary BWP uplink configuration IE according to some embodiments of the present application;

FIG. 11 illustrates an exemplary CG configuration IE according to some other embodiments of the present application;

FIG. 12 illustrates an exemplary CG configuration IE according to some other embodiments of the present application;

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present application are also applicable to similar technical problems; and moreover, the terminologies recited in the present application may change, which should not affect the principle of the present application.

A wireless communication system generally includes one or more base stations (BSs) and one or more UEs. Furthermore, a BS may be configured with one TRP (or panel) or more TRPs (or panels). A TRP can act like a small BS. The TRPs can communicate with each other by a backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g. on the order of tens of milliseconds, than that of the ideal backhaul link.

In a wireless communication system, one single TRP can be used to serve one or more UEs under control of a BS. In different scenario, TRP may be called in different terms. Persons skilled in the art should understand that as the 3rd Generation Partnership Project (3GPP) and the communication technology develop, the terminologies recited in the specification may change, which should not affect the scope of the present application. It should be understood that the TRP(s) (or panel(s)) configured for the BS may be transparent to a UE.

Figure 1:
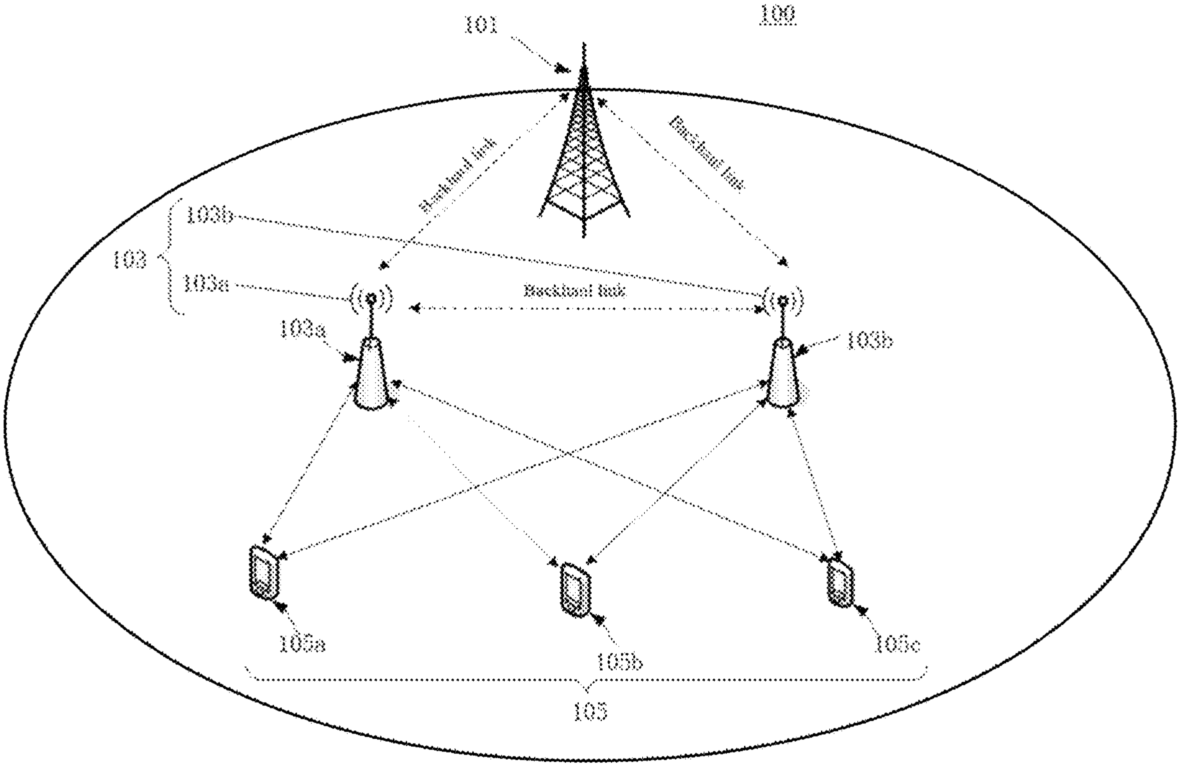
FIG. 1 is a schematic diagram illustrating an exemplary wireless communication system according to some embodiments of the present application.

FIG. 1 is a schematic diagram illustrating an exemplary wireless communication system 100 according to some embodiments of the present application.

Referring to FIG. 1, a wireless communication system 100 can include a base station (BS) 101, TRPs 103 (e.g., TRP 103*a* and TRP 103*b*), and UEs 105 (e.g., UE 105*a*, UE 105*b*, and UE 105*c*). Although only one base station 101, two TRPs 103 and three UEs 105 are shown for simplicity, it should be noted that the wireless communication system 100 may include more or less communication device(s) or apparatus in accordance with some other embodiments of the present application.

In some embodiments of the present application, a BS 101 may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. The UEs 105 (for example, the UE 105*a*, the UE 105*b*, and the UE 105*c*) may include, for example, but is not limited to, a computing device, a wearable device, a mobile device, an IoT device, a vehicle, etc.

The TRPs 103, for example, the TRP 103*a* and the TRP 103*b* can communicate with the base station 101 via, for example, a backhaul link. Each of TRPs 103 can serve some or all of UEs 105. As shown in FIG. 1, the TRP 103*a* can serve some mobile stations (which include the UE 105*a*, the UE 105*b*, and the UE 105*c*) within a serving area or region (e.g., a cell or a cell sector). The TRP 103*b* can serve some mobile stations (which include the UE 105*a*, the UE 105*b*, and the UE 105*c*) within a serving area or region (e.g., a cell or a cell sector). The TRP 103*a* and the TRP 103*b* can communicate with each other via, for example, a backhaul link.

In Rel-17, PUSCH transmission with multi-TRP is specified to improve reliability and robustness. According to some embodiments of the present application, the PUSCH transmission towards multiple TRPs may be transmitted based on one or more configured grants.

There are two methods that may be used to implement the CG based PUSCH transmission. One method is transmitting the repetitions of a transport block (TB) towards multiple TRPs on multiple PUSCH transmission occasions from a single CG configuration. Another method is transmitting the repetitions of a TB towards multiple TRPs on multiple PUSCH transmission occasions from multiple CG configurations, wherein each CG configuration may have one or more PUSCH transmission occasions.

Figure 2:
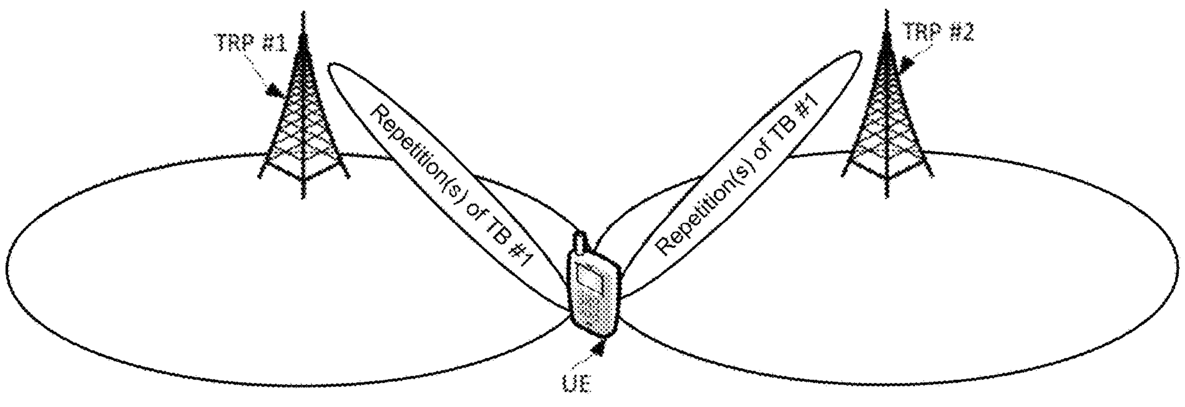
FIG. 2 is a schematic diagram illustrating an exemplary TB transmission towards multiple TRPs according to multiple CG configurations according to some embodiments of the present application.

FIG. 2 is a schematic diagram illustrating an exemplary TB transmission towards multiple TRPs according to multiple CG configurations according to some embodiments of the present application.

Referring to FIG. 2, it is assumed that there are two TRPs (e.g., TRP #1 and TRP #2), two CG configurations (e.g., CG configuration #1 and CG configuration #2), two SRS resource sets (e.g., SRS resource set #1 and SRS resource set #2), two uplink (UL) transmission configuration indicators (TCI) (e.g., TCI #1 and TCI #2) or two SRS resource indicators (SRI) (e.g., SRI #1 and SRI #2) are used in the multi-TRP transmission.

A UE may transmit one or more repetitions of a TB (e.g., TB #1) towards TRP #1 on one or more PUSCH transmission occasions from CG configuration #1. The spatial relation of the one or more repetitions towards TRP #1 may be determined based on a UL TCI #1 or an SRI #1 which indicates one or more SRS resources in an SRS resource set #1. The UE may also transmit one or more repetitions of a TB towards TRP #2 on one or more PUSCH transmission occasions from CG configuration #2. The spatial relation of the one or more repetitions towards TRP #2 may be determined based on a UL TCI #2 or an SRI #2 which indicates one or more SRS resources in an SRS resource set #2.

To support the multi-TRP transmission as shown in FIG. 2, the UE needs to know which CG configurations are associated for the multi-TRP transmission. The UE may also need to know how to transmit the repetitions of the TB on multiple PUSCH transmission occasions from multiple associated CG configurations. Moreover, since multiple SRS resource sets are supported in multi-TRP transmission, the UE may need to know which SRS resource set is used for each CG configuration of the multiple associated CG configurations. In addition, other requirements, such as the same TB size and same HARQ process ID, should be ensured for the multiple associated CG configurations.

That is, in order to support TB transmission towards multi-TRP based on multiple CG configurations, several problems, e.g., how to associate the multiple CG configurations, how to transmit the TB based on the multiple CG configurations, how to determine the SRS resource set for the multiple CG configurations, how to ensure the same HARQ process for the multiple CG configurations, and other requirements, need to be addressed.

Given the above, embodiments of the present application aim to provide solutions for multi-TRP transmission. Accordingly, embodiments of the present application at least can solve the above technical problems, thereby implementing the TB transmission toward multi-TRP according to the multiple CG configurations. More details on embodiments of the present application will be illustrated in the following text in combination with the appended drawings.

Figure 3:
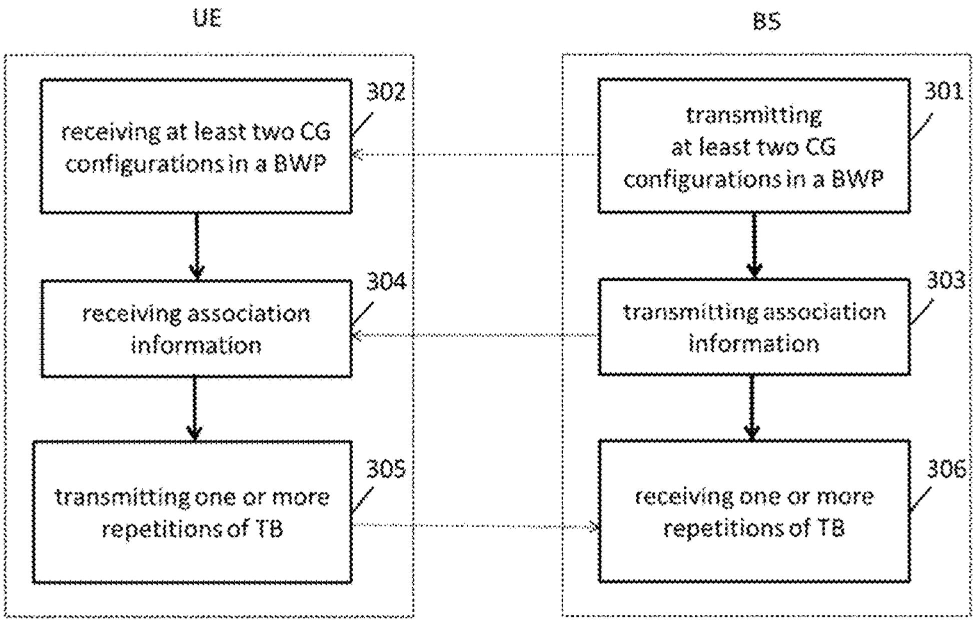
FIG. 3 illustrates a method for multi-TRP transmission according to some embodiments of the present application.

FIG. 3 illustrates a method for multi-TRP transmission according to some embodiments of the present application. Although the method is illustrated in a system level by a UE and a BS (e.g., UE 105 and BS 101 as illustrated and shown in FIG. 1), persons skilled in the art can understand that the method implemented in the UE and that implemented in the BS can be separately implemented and incorporated by other apparatus with the like functions.

In the exemplary method in FIG. 3, at step 301, the BS may transmit at least two CG configurations in a BWP to the UE. At step 302, the UE may receive the at least two CG configurations. Each CG configuration may be configured with a unique index (e.g. configuredGrantConfigIndex-r16 as specified in 3GPP standard document TS 38.331).

Each CG configuration may include a plurality of parameters for the PUSCH transmission. According to some embodiments, the CG configuration for PUSCH transmission may be classified into two types, i.e., type 1 CG (also referred to as type 1 PUSCH transmissions with a configured grant or type 1 CG configuration) and type 2 configured grant (also referred to as type 2 PUSCH transmissions with a configured grant or type 2 CG configuration).

For the type 1 CG, the CG configuration may be configured by a radio resource control (RRC) signalling (e.g., ConfiguredGrantConfig as specified in 3GPP standard document 38.331). The CG configuration may include all the parameters for the PUSCH transmission. These parameters may include but not are limited to: periodicity, number of repetitions, number of HARQ processes, SRI, CG configuration index, priority, UL grant (e.g. rrc-ConfiguredUplinkGrant), and so on. For the type 1 CG, after receiving the RRC signalling including the CG configuration, the UE may perform the PUSCH transmission based on the CG configuration without the detection of a UL grant in a DCI. That is, for the type 1 CG, the PUSCH transmission is semi-statically configured to operate after the reception of a CG configuration without the detection of a UL grant in a DCI.

For the type 2 CG, the CG configuration may also be configured by a radio resource control (RRC) signalling (e.g., ConfiguredGrantConfig as specified in 3GPP standard document 38.331), but may include only a portion of parameters for the PUSCH transmission. For example, the CG configuration may include but not limit to: periodicity, number of repetitions, number of HARQ processes, CG configuration index, priority, and so on. The difference between type 2 CG and type 1 CG is that for the type 2 CG, after receiving the CG configuration, the UE may also receive DCI for activating the CG configuration. The DCI may indicate an UL grant for the PUSCH transmission. After receiving the DCI, the UE may perform the PUSCH transmission based on the parameters included in the CG configuration and the UL grant indicated by the DCI. That is, for the type 2 CG, the PUSCH transmission is semi-persistently scheduled by a UL grant in a valid activation DCI. The CG configuration may be deactivated by another DCI.

In step 303, the BS may transmit association information for associating the at least two CG configurations. Consequently, in step 304, the UE may receive the association information. Although FIG. 3 illustrates that step 303 is performed after step 301 and step 304 is performed after step 302, persons skilled in the art can understand that step 303 and step 301 may be performed simultaneously and step 304 step 302 may be performed simultaneously in some other embodiments. For example, the association information may be included in one CG configuration of the at least two CG configurations.

According to some embodiments of the present application, one CG configuration of the at least two CG configurations may include index(es) of remaining CG configuration(s) of the at least two CG configurations. The remaining CG configuration(s) may be configured before or as same time as the one CG configuration. By this way, the at least two CG configurations may be associated with each other. The associated CG configurations may have a same priority. In this case, the association information may include configuring index(es) of remaining CG configuration(s) of the at least two CG configurations in one CG configuration.

In some embodiments, each CG configuration may be presented by a ConfiguredGrantConfig IE as specified in 3GPP standard document TS 38.331. Each CG configuration is configured with a unique index by configuredGrantConfigIndex-r16 in the ConfiguredGrantConfig IE. Given this, the at least two configurations may be associated together by adding one or more associated CG configuration indexes in one ConfiguredGrantConfig IE.

FIG. 4 illustrates an exemplary CG configuration IE according to some embodiments of the present application. In FIG. 4, it is assumed that there are two CG configurations are configured for the multi-TRP transmission, and the ConfiguredGrantConfig IE in FIG. 4 is for one CG configuration of the two CG configurations Referring to FIG. 4, the ConfiguredGrantConfig IE may include a parameter configuredGrantConfigIndex-r16 indicating the index of the one CG configuration and a newly added parameter associatedconfiguredGrantConfigIndex indicating the index of the other associated one configuration. In addition to these two parameters, other parameters may have the same meaning as specified in 3GPP standard document TS 38.331.

After receiving the one CG configuration of the at least two CG configurations, for type 1 CG, the UE may determine the at least two CG configurations are associated because the indexes of the at least two CG configurations are included in the one CG configuration.

For type 2 CG, in some embodiments, the UE may receive a respective DCI for activating a respective CG configuration of the at least two CG configurations. Each DCI may include an HPN which has the same value as an index of the corresponding CG configuration. The one CG configuration which contains the index(es) of remaining CG configuration(s) of the at least two CG configurations should be activated at the latest and the remaining CG configuration(s) should be activated before activating the one CG configuration which contains the index(es) of remaining CG configuration(s).

For type 2 CG, in some other embodiments, the UE may also receive DCI for activating the at least two CG configuration. The DCI may include an HPN which has the same value as an index of the one CG configuration. After receiving the DCI, the UE may assume that the one CG configuration and the associated CG configurations (i.e., the at least two CG configurations) are activated.

For example, it is assumed that two type 2 CG configurations (i.e., configuration #3 and CG configuration #5) are configured for the multi-TRP transmission. The CG configuration #3 may include the index (i.e., "5") of CG configuration #5.

After receiving the two CG configurations, the UE may also receive DCI for activating the two CG configurations. The DCI may include an HPN with a value "0011." Then the UE may determine that CG configuration #3 is activated because the value of HPN equals to the index “3” of CG configuration #3. The UE may also determine that CG configuration #5 is activated simultaneously with CG configuration #3 because the two CG configurations are associated. After that, the UE may transmit repetitions of a TB according to both CG configuration #3 and CG configuration #5.

According to some embodiments of the present application, the association information may include an association CG configuration list containing one or more entries. Each entry may correspond to an association state. Each association state may include one or more indexes of one or more CG configuration. The one or more CG configurations whose indexes are included in a same association state may be associated with each other and have the same priority. Given this, one association state of the one or more association states may include indexes of the at least two CG configurations such that the at least two CG configurations are associated with each other.

In some embodiments, the association CG configuration list may be included in a BWP uplink configuration IE (e.g., BWP-UplinkDedicated IE as specified in 3GPP standard document TS 38.331).

FIG. 5 illustrates an exemplary BWP uplink configuration IE according to some embodiments of the present application. In FIG. 5, the newly added parameter ConfiguredGrantActivationStateList in BWP-UplinkDedicated may refer to the association CG configuration list, and the parameter maxNrofCG-ActivationState may refer to the maximum number of association states in the association CG configuration list. The newly added parameter ConfiguredGrantActivationState may refer to the association state in the association CG configuration list. In addition to these parameters, other parameters may have the same meanings as specified in 3GPP standard document TS 38.331.

After receiving the at least two CG configurations and one association state including the indexes of the at least two CG configurations, for type 1 CG, the UE may determine the at least two CG configurations are associated because the indexes of the at least two CG configurations are included in the one association state. Then the UE may transmit repetitions of a TB according to the at least two CG configurations.

For type 2 CG, the UE may also receive DCI for activating the at least two CG configuration. The DCI may include an HPN field which indicates an entry in the association CG configuration list corresponding to the one association state including the indexes of the at least two CG configurations. After receiving the DCI, the UE may determine that the at least two CG configurations are activated.

For example, it is assumed that an association CG configuration list is configured in a BWP which contains three entries (e.g., entry #0, entry #1, and entry #2). Each entry may correspond to an association state. That is, the association CG configuration list may include three association states (e.g., state #0, state #1, and state #2). Entry #0 (i.e., the association state #0) may include CG configuration #0, entry #1 (i.e., the association state #1) may include CG configuration #2 and CG configuration #4, and entry #2 (i.e., the association state #2) may include CG configuration #1 and CG configuration #5.

For type 1 CG, if a UE transmits one or more repetitions of a TB according to CG configuration #2, the UE may also transmit another one or more repetitions of the TB according to CG configuration #4 because the CG configuration #2 and the CG configuration #4 are in the same association state.

For type 2 CG, assume that the UE detects an activation DCI including an HPN with a value “0010.” Since the value “0010” which equals to 2 may indicate entry #2 corresponding to the association state #2, the DCI will activate the associated CG configuration #1 and CG configuration #5 simultaneously in the association state #2. Then, the UE may transmit one or more repetitions of a TB according to CG configuration #1 and transmit another one or more repetitions of the TB according to CG configuration #5.

According to some other embodiments, the association information may be indicated by a MAC CE command. Compared with a RRC signalling, using a MAC CE command to associate the one or more CG configurations may be more flexible and has less delay. The associated CG configurations may have a same priority.

In some embodiments, indexes of the one or more CG configuration in a same octet of the MAC CE command may be associated with each other. Given this, the indexes of at least two CG configurations may be included in a same octet of the MAC CE.

Figure 6:
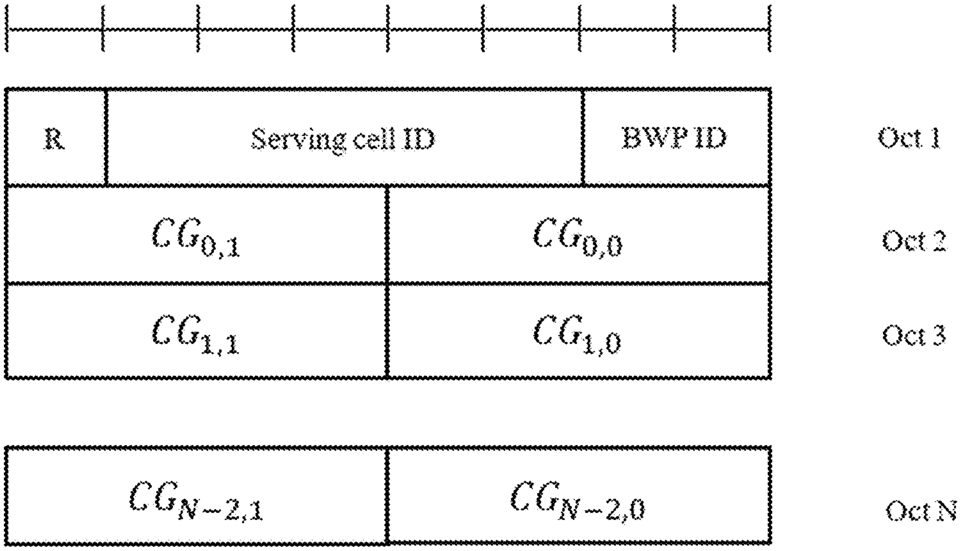
FIG. 6 illustrates an exemplary MAC CE command according to some embodiments of the present application.

FIG. 6 illustrates an exemplary MAC CE command according to some embodiments of the present application.

Referring to FIG. 6, the MAC CE command may include N octets (e.g., Oct 1 to Oct N), wherein N is an integer larger than 1. Oct 1 may include a reserved bit, a serving cell ID, and a BWP ID. Each $CG_{i,j}$ (where i=0, 1, 2 . . . , N−2; j=0,1) may refer to a CG configuration index. Each octet of the remaining N−1 octets may include two indexes of the two CG configurations, which means that the two CG configurations are associated with each other. For example, $CG_{0,0}$ may be associated with $CG_{0,1}$, $CG_{1,0}$ may be associated with $CG_{1,1}$, . . . , and $CG_{N-2,0}$ may be associated with $CG_{N-2,1}$. In the case that the two indexes in the same octet are the same, the UE may assume that the CG configuration with the same index is not associated with other CG configurations. For example, assuming that $CG_{0,0}$ is the same as $CG_{0,1}$, the UE may determine that the CG configuration with the index $CG_{0,0}$ is not associated with other CG configurations.

For example, it is assumed that the association information is indicated by a MAC CE command as shown in FIG. 6, wherein $CG_{0,0}$ equals to 0000 and $CG_0$,1 equals to 0010, then a UE may assume CG configuration #0 and CG configuration #2 are associated. If a UE transmits one or more repetitions of the TB according to CG configuration #0, the UE may also transmit another one or more repetitions of the TB according to CG configuration #2.

Assuming that $CG_{1,0}$ equals 0100 and $CG_{1,1}$ equals 0100, then a UE may assume CG configuration #4 is not associated with other CG configurations and will transmit one or more repetitions of the TB only according to CG configuration #4.

After receiving the association information and the at least two CG configurations, at step 305, the UE may transmit one or more repetitions of a TB on one or more PUSCH transmission occasions from each CG configuration of the at least two CG configurations based on the association information. Consequently, in step 306, the BS may receive the one or more repetitions of the TB on one or more PUSCH transmission occasions from each CG configuration of the at least two CG configurations.

In some embodiments, a time duration for all repetitions (e.g., all repetitions transmitted based on the at least two CG configurations) of the TB is less than or equal to a time duration derived by a periodicity of the at least two CG configurations. In other words, the UE is not expected to be configured with a time duration for the transmission of a number of total repetitions of a TB larger than the time duration derived by the periodicity.

According to some embodiments, the PUSCH repetition schemes may be classified into two types, i.e., PUSCH repetition Type A and PUSCH repetition Type B.

The PUSCH repetition Type A is a slot level repetition scheme. According to TS 38.214, for PUSCH repetition Type A, the starting symbol S relative to the start of the slot, and the number of consecutive symbols L counting from the symbol S allocated for the PUSCH are determined from the start and length indicator (SLIV). The SLIV may be included in a time domain resource allocation (TDRA) table as specified in 3GPP standard documents. In case number of repetitions K>1, the same symbol allocation is applied across the K consecutive slots and the PUSCH is limited to a single transmission layer. The UE shall repeat the TB across the K consecutive slots applying the same symbol allocation in each slot. The number of repetitions K may be configured in a CG configuration by a parameter repK or by a parameter numberofrepetitions in an entry of a TDRA table if present.

The PUSCH repetition Type B is a sub-slot level repetition scheme. According to TS 38.214, for PUSCH repetition Type B, the starting symbol S relative to the start of the slot, and the number of consecutive symbols L counting from the symbol S allocated for the PUSCH are provided by startSymbol and length of the indexed row of the resource allocation table, respectively. For PUSCH repetition Type B, except for PUSCH transmitting channel state information (CSI) report(s) with no transport block, the number of nominal repetitions is given by numberofrepetitions. For the n-th nominal repetition, n=0, . . . , numberofrepetitions−1, The slot where the nominal repetition starts is given by $$K_s+\left\lfloor \frac{S+n*L}{N_{symb}^{slot}} \right\rfloor, \quad (1)$$

and the starting symbol relative to the start of the slot is given by mod $$\left(S+n*L,\ N_{symb}^{slot}\right) \quad (2)$$

The slot where the nominal repetition ends is given by $$K_s+\left\lfloor \frac{S+(n+1)*L-1}{N_{symb}^{slot}} \right\rfloor, \quad (3)$$

and the ending symbol relative to the start of the slot is given by mod $$\left(S+(n+1)*L-1,\ N_{symb}^{slot}\right). \quad (4)$$

Here $K_s$ is the slot where the PUSCH transmission starts, and $$N_{symb}^{slot}$$

is the number of symbols per slot as defined in Clause 4.3.2 of [4, TS 38.211].

In Rel-16, a CG configuration only configures a periodicity without an offset. Accordingly, if multiple associated type 1 CG configurations are configured or multiple associated type 2 CG configurations are activated, the PUSCH transmission occasions may start from a same slot or even start from a same symbol. However, since the PUSCH transmissions according to different CG configuration are transmitted in a time-division multiplexing (TDM) manner, the PUSCH transmission occasions from a same slot or a same symbol cannot be implemented. Even though each CG configuration of the at least two CG configurations may occupy different symbols within a slot to implement the TDM scheme, it will impose much limitations on the CG configurations and limit the flexibility of the BS. There are several methods which can solve the above problem.

According to some embodiments of the present application, each CG configuration of the at least two CG configurations may include a slot offset within a periodicity of the at least two CG configurations. The slot offset configured in each configuration of the at least two CG configurations may be same or different. The one or more PUSCH transmission occasions from each CG configuration of the at least two CG configurations are non-overlapped in time domain due to the slot offset of each CG configuration. In these embodiments, a time duration for all repetitions of the TB is less than or equal to a time duration derived by a periodicity of the at least two CG configurations FIG. 7 illustrates an exemplary TB transmission on PUSCH transmission occasions from multiple CG configurations according to some embodiments of the present application.

Figure 7:
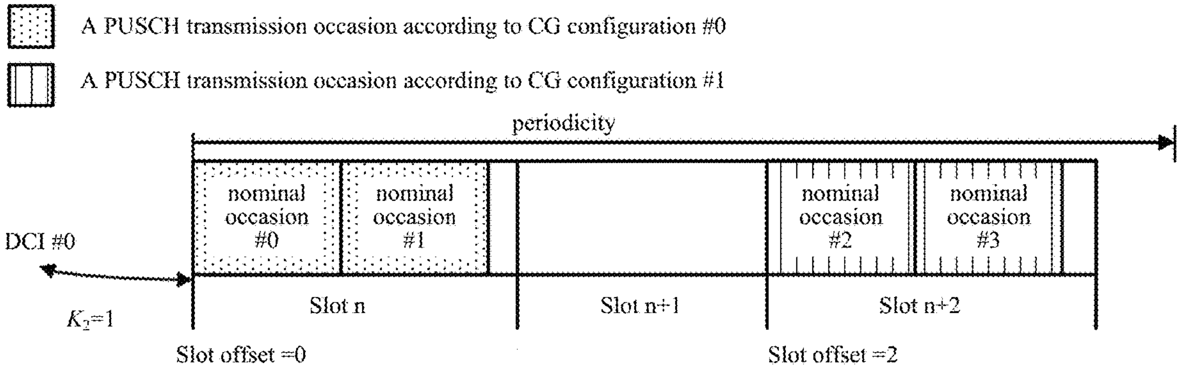
FIG. 7 illustrates an exemplary TB transmission on PUSCH transmission occasions from multiple CG configurations according to some embodiments of the present application.

Referring to FIG. 7, it is assumed that two type 2 CG configurations (e.g., CG configuration #0 and CG configuration #1) are configured for the multi-TRP transmission and the transmission type of PUSCH repetitions is PUSCH repetition type B. The number of repetitions configured in each CG configuration is two, which means that CG configuration #0 and CG configuration #1 may both have two PUSCH transmission occasions in a periodicity.

Since type 2 CG configurations are configured, at a time, the UE may receive DCI #0 including an HPN having a value "0000." That is, after receiving the DCI, both CG configuration #0 and CG configuration #1 are activated.

The DCI may also include a time domain resource assignment field with a value m. The value m provides a row index m+1 to the TDRA table. The indexed row defines the slot offset $K_2$, the start symbol, and the length. In the example of FIG. 7, it is assumed that the $K_2$ is equal to 1, the start symbol is equal to 0, and the length is equal to 5 symbols. Moreover, it is assumed that the slot offset configured in CG configuration #0 is zero and the slot offset configured in CG configuration #1 is two.

Referring to FIG. 7, assuming that the DCI is received in slot n−1, since $K_2$−1 and the slot offset of CG configuration #0 is zero, the start slot of the PUSCH transmission from CG configuration #0 may be slot n. Moreover, since PUSCH repetition type B is configured, the start symbol 0 and length 5 may be input to the formulas (1)-(4) to determine the two PUSCH transmission occasions. Accordingly, the two PUSCH transmission occasions from CG configuration #0 may be nominal occasion #0 (which is from symbol 0 to symbol 4) and nominal occasion #1 (which is from symbol 5 to symbol 9) in slot n as shown in FIG. 7.

For the CG configuration #1, since $K_2$=1 and the slot offset of CG configuration #1 is two, the start slot of the PUSCH transmission from CG configuration #1 may be slot n+2. Moreover, since PUSCH repetition type B is configured, the start symbol 0 and length 5 may be input to the formulas (1)-(4) to determine the two PUSCH transmission occasions. Accordingly, the two PUSCH transmission occasions from CG configuration #1 may be nominal occasion #2 (which from symbol 0 to symbol 4) and nominal occasion #3 (which from symbol 5 to symbol 9) in slot n+2 as shown in FIG. 7.

According to some other embodiments, in order to implement the TDM scheme of the TB transmission according to at least two CG configurations, one or more PUSCH transmission occasions from each CG configuration of the at least two CG configurations may be concatenated according to an order of CG configuration. The start slot of the first PUSCH transmission occasion from a succeeding CG configuration equals to an end slot of the last PUSCH transmission occasion from a preceding CG configuration plus one.

In some embodiments, the order of CG configuration may be an order from the CG configuration with smallest index to the CG configuration with largest index. That is, the PUSCH transmission occasions from CG configurations with larger index are appended after the PUSCH transmission occasions from CG configurations with smaller index.

In some other embodiments, the order of CG configuration may be an order from the CG configuration with largest index to the CG configuration with smallest index. That is, the PUSCH transmission occasions from CG configurations with smaller index are appended after the PUSCH transmission occasions from CG configurations with larger index.

In some other embodiments, the order of CG configuration may be any other order configured by the BS or predefined for the UE. Then, the PUSCH transmission occasions from one CG configuration may be appended to the PUSCH transmission occasions from another CG configuration according to the defined order.

In these embodiments, the PUSCH occasion(s) from each CG configuration is determined same as Rel-16. That is, for PUSCH repetition Type A, the PUSCH transmission occasion within a slot is determined by a corresponding SLIV, same allocation is applied across the RepKi consecutive slots from a CG configuration. For PUSCH repetition Type B, the start symbol and slot and the end symbol and slot of each PUSCH nominal transmission occasion from a CG configuration is determined same in Rel-16. By concatenating the PUSCH occasion(s) from each CG configuration in sequentially, the TDM manner may be implemented.

In these embodiments, assuming that there are two CG configurations are configured, and the number of repetitions of a TB transmitted on PUSCH transmission occasion(s) from one CG configuration is RepK1 and the number of repetitions of the TB transmitted on PUSCH transmission occasion(s) from another CG configuration is RepK2, then the total number of repetitions of a TB towards multi-TRP is RepK which equals to RepK1 plus RepK2. A time duration for all repetitions of the TB (i.e., RepK) is less than or equal to a time duration derived by a periodicity of each of the two CG configurations.

Figure 8:
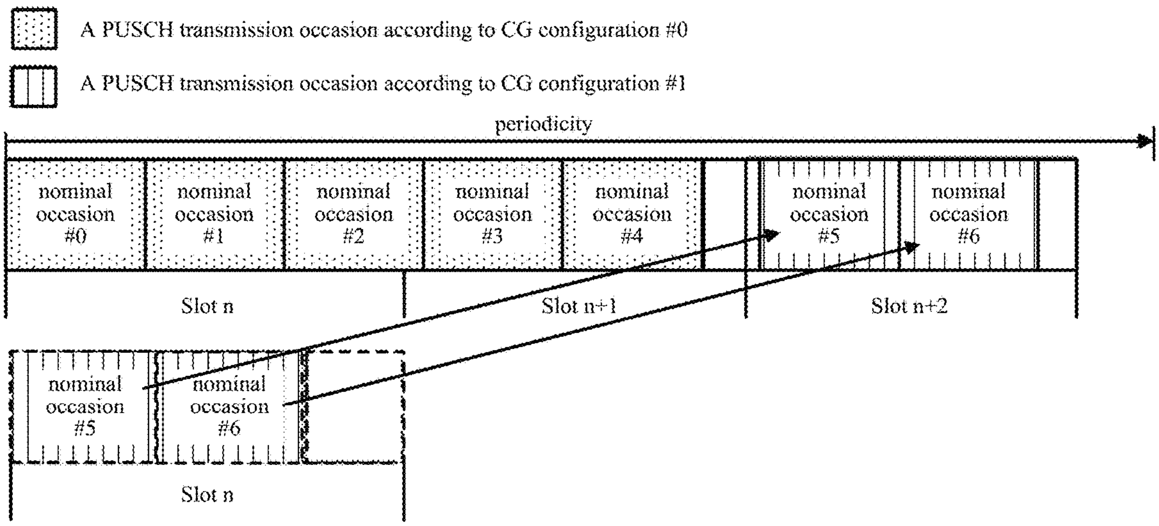
FIG. 8 illustrates another exemplary TB transmission on PUSCH transmission occasions from multiple CG configurations according to some other embodiments of the present application.

FIG. 8 illustrates another exemplary TB transmission on PUSCH transmission occasions from multiple CG configurations according to some other embodiments of the present application.

Referring to FIG. 8, it is assumed that two type 1 CG configuration (e.g., CG configuration #0 and CG configuration #1) are configured simultaneously for the multi-TRP transmission and the transmission type of PUSCH repetitions is PUSCH repetition type B. The number of repetitions configured in CG configuration #0 is five and the number of repetitions configured in CG configuration #1 is 2, which means that CG configuration #0 has five PUSCH transmission occasions in a periodicity and CG configuration #1 may have two PUSCH transmission occasions in the periodicity.

Moreover, assuming that start symbol is symbol #0 and length of the CG PUSCH is 5 symbols as indicated by SLIV #0 configured in CG configuration #0, and the start symbol is symbol #1 and length of the CG PUSCH is 5 symbols as indicated by SLIV #1 configured in CG configuration #1.

Referring to FIG. 8, since type 1 CG configurations are configured simultaneously, the start slots of CG configuration #0 and CG configuration #1 may be the same, e.g., slot n.

Since PUSCH repetition type B is configured, the start symbol 0 and length 5 may be input to the formulas (1)-(4), such that the five PUSCH transmission occasions from CG configuration #0 may be nominal occasion #0 (which is from symbol 0 to symbol 4 in slot n), nominal occasion #1 (which is from symbol 5 to symbol 9 in slot n), nominal occasion #2 (which is from symbol 10 in slot n to symbol 0 in slot n+1), nominal occasion #3 (which is from symbol 1 to symbol 5 in slot n+1), and nominal occasion #4 (which is from symbol 6 to symbol 10 in slot n+1) as shown in FIG. 8.

For the CG configuration #1, by applying the start symbol 1 and length 5 into the formulas (1)-(4), it can be determined that the two PUSCH transmission occasions from CG configuration #1 may be nominal occasion #5 (which is from symbol 1 to symbol 5 in slot n) and nominal occasion #6 (which is from symbol 6 to symbol 10 in slot n) as shown in FIG. 8.

In order to implement the TDM transmission scheme, the PUSCH transmission occasions from CG configuration #0 and CG configuration #1 may be concatenated according to an order of CG configuration with the smallest index to CG configuration with the largest index. That is, the two PUSCH transmission occasions from CG configuration #1 may be appended after the five PUSCH transmission occasions from CG configuration #0. Then, the start slot of the two PUSCH transmission occasions from CG configuration #1 may be changed to slot n+2, which equals to an end slot of CG configuration #0 (i.e., slot n+1) plus one.

According to some other embodiments, in order to implement the TDM transmission scheme, each CG configuration of the at least two CG configurations may include a first number of consecutive repetitions of the TB transmitted according to the corresponding CG configuration, and the at least one CG configuration includes a second number of total repetitions of the TB. For each CG configuration, the first number may be configured to be the same or different.

In some embodiments, the first number of consecutive repetitions of the TB may be configured by a parameter RepK in each CG configuration as specified in 3GPP standard documents or may be configured by numberofrepetitions in an entry of a TDRA table if present as specified in 3GPP standard documents. The second number of total repetitions of a TB may be configured by a newly added parameter total_RepK introduced in one or more CG configurations of the at least two CG configurations. For example, the total_RepK may be included in one CG configuration which includes indexes of remaining CG configurations of the at least two CG configurations. In another example, the total_RepK may be included in each of the at least two CG configurations.

After receiving the at least two CG configurations, the UE may transmit the first number of consecutive repetitions of the TB on the first number of PUSCH transmission occasions from each CG configuration according to an order of CG configuration. The order of CG configuration may be an order from the CG configuration with smallest index to the CG configuration with largest index, or an order from the CG configuration with largest index to the CG configuration with smallest index, or any other order configured by the BS or predefined in the UE. The UE may repeat the transmitting until the second number of total repetitions is met. For all the PUSCH transmission occasions arranged in order for transmitting the second number of total repetitions, the start slot of the first PUSCH transmission occasion from a succeeding CG configuration equals to an end slot of the last PUSCH transmission occasion from a preceding CG configuration plus one.

Figure 9:
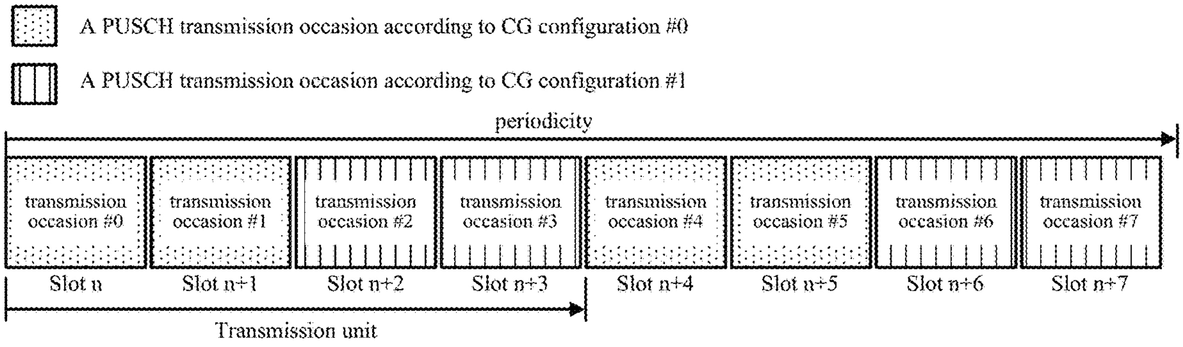
FIG. 9 illustrates yet another exemplary TB transmission on PUSCH transmission occasions from multiple CG configurations according to some other embodiments of the present application.

FIG. 9 illustrates yet another exemplary TB transmission on PUSCH transmission occasions from multiple CG configurations according to some other embodiments of the present application.

Referring to FIG. 9, it is assumed that two type 1 CG configuration (e.g., CG configuration #0 and CG configuration #1) are configured for the multi-TRP transmission and the transmission type of PUSCH repetitions is PUSCH repetition Type A. The number of consecutive repetitions of a TB configured in CG configuration #0 is 2, the number of consecutive repetitions of the TB configured in CG configuration #1 is 2. and the number of total repetitions is 8.

Moreover, assuming that start symbol is symbol #0 and length of the PUSCH transmission occasion is 10 symbols as indicated by SLIV #0 configured in CG configuration #0, and the start symbol is symbol #3 and length of the CG PUSCH is 10 symbols as indicated by SLIV #1 configured in CG configuration #1.

Since the type of PUSCH repetitions is PUSCH repetition Type A, the two PUSCH transmission occasions from CG configuration #0 in two consecutive slots may have the same symbol allocation (i.e., from symbol #0 to symbol #9), and the two PUSCH transmission occasions from CG configuration #1 in two consecutive slots may have the same symbol allocation (i.e., from symbol #3 to symbol #12).

Referring to FIG. 9, the order of the CG configuration may be an order from CG configuration with smallest index to the CG configuration with largest index. Therefore, the UE may first transmit two repetitions of the TB on the two consecutive PUSCH transmission occasions (i.e., transmission occasion 0 in slot n and transmission occasion 1 in slot n+1) from CG configuration #0, and then transmit two repetitions of the TB on the two consecutive PUSCH transmission occasions (i.e., transmission occasion 2 in slot n+2 and transmission occasion 3 in slot n+3) from CG configuration #1. The UE may repeat the transmitting until the 8 total repetitions of TB is reached. In FIG. 9, the transmitting may be repeated twice in general until reaching 8 total repetitions of the TB. The transmission occasion #0 to transmission occasion #3 may be referred to as a transmission unit. That is, the transmission unit may be repeated twice.

Referring to FIG. 9, for the eight PUSCH transmission occasions, the start slot of the first PUSCH transmission occasion from a succeeding CG configuration equals to an end slot of the last PUSCH transmission occasion from a preceding CG configuration plus one. For example, the start slot (e.g., slot n+2) of transmission occasion #2 from CG configuration #1 equals to the end slot (e.g., slot n+1) of transmission occasion #1 from CG configuration #0 plus one. Similarly, the start slot (e.g., slot n+4) of transmission occasion #4 from CG configuration #0 equals to the end slot (e.g., slot n+3) of transmission occasion #3 from CG configuration #1 plus one, and the start slot (e.g., slot n+6) of transmission occasion #6 from CG configuration #1 equals to the end slot (e.g., slot n+5) of transmission occasion #5 from CG configuration #0 plus one.

According to some other embodiments, in order to implement the TDM transmission scheme, each CG configuration of the at least two CG configurations may include a first number of total repetitions of a TB transmitted according to the corresponding CG configuration and a second number of consecutive repetitions of the TB transmitted according to the corresponding CG configuration. For each CG configuration, the first number may be configured to be the same or different, and the second number may be configured to be the same or different.

In some embodiments, the first number of total repetitions of the TB may be configured by a parameter RepK in each CG configuration as specified in 3GPP standard documents or may be configured by numberofrepetitions in an entry of a TDRA table if present as specified in 3GPP standard documents. The second number of consecutive repetitions of the TB may be configured by a parameter Con_K newly added in each of the at least two CG configurations.

After receiving the at least two CG configurations, the UE may transmit the second number of consecutive repetitions of the TB on the second number of PUSCH transmission occasions from each CG configuration for which the first total number of repetitions of the TB is not reached according to an order of CG configuration. The order of CG configuration is determined based on all CG configuration(s) of the at least two CG configurations for which the first total number of repetitions of the TB is not reached. The UE may repeat the transmitting until the first total number of repetitions of a TB included in each CG configuration is reached.

The order of CG configuration may be an order from the CG configuration with smallest index to the CG configuration with largest index, or an order from the CG configuration with largest index to the CG configuration with smallest index, or any other order configured by the BS or predefined in the UE.

For all the PUSCH transmission occasions arranged in order for transmitting the first number of total repetitions included in each CG configuration, the start slot of the first PUSCH transmission occasion from a succeeding CG configuration equals to an end slot of the last PUSCH transmission occasion from a preceding CG configuration plus one.

Figure 10:
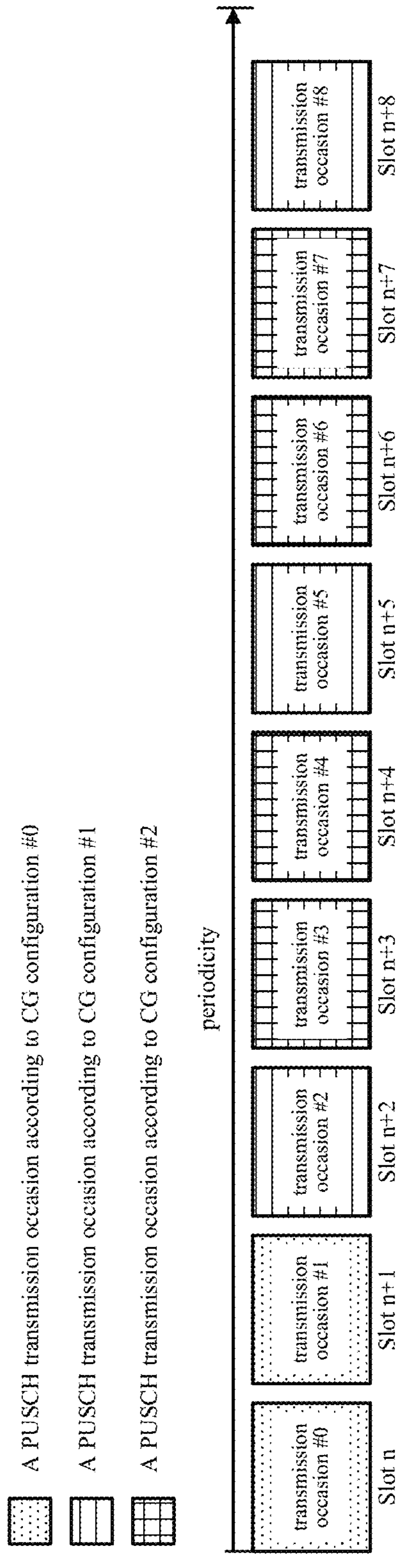
FIG. 10 illustrates yet another exemplary TB transmission on PUSCH transmission occasions from multiple CG configurations according to some other embodiments of the present application.

FIG. 10 illustrates yet another exemplary TB transmission on PUSCH transmission occasions from multiple CG configurations according to some other embodiments of the present application.

Referring to FIG. 10, it is assumed that three type 1 CG configurations (e.g., CG configuration #0, CG configuration #1, and CG configuration #1) are configured for the multi-TRP transmission and the type of PUSCH repetitions is PUSCH repetition type A. The first number of total repetitions of a TB and the second number of consecutive repetitions of a TB configured in CG configuration #0 are 2 and 2 respectively, the first number of total repetitions of a TB and the second number of consecutive repetitions of a TB configured in CG configuration #1 are 3 and 1 respectively, and the first number of total repetitions of a TB and the second number of consecutive repetitions of a TB configured in CG configuration #2 are 4 and 2 respectively.

Moreover, assuming that start symbol is symbol #0 and length of the PUSCH transmission occasion is 10 symbols as indicated by SLIV #0 configured in CG configuration #0, the start symbol is symbol #2 and length of the PUSCH transmission occasion is 10 symbols as indicated by SLIV #1 configured in CG configuration #1, and the start symbol is symbol #3 and length of the CG PUSCH is 10 symbols as indicated by SLIV #2 configured in CG configuration #2. Since the type of PUSCH repetitions is PUSCH repetition Type A, the PUSCH transmission occasions from the same CG configuration may have the same symbol application.

Since the type of PUSCH repetitions is PUSCH repetition type A, the PUSCH transmission occasions from CG configuration #0 in two slots may have the same symbol allocation (i.e., from symbol #0 to symbol #9), the three PUSCH transmission occasions from CG configuration #1 in three slots may have the same symbol allocation (i.e., from symbol #2 to symbol #11), and the four PUSCH transmission occasions from CG configuration #2 in four slots may have the same symbol allocation (i.e., from symbol #3 to symbol #12).

Referring to FIG. 10, the order of the CG configuration may be an order from CG configuration with smallest index to the CG configuration with largest index. Therefore, the UE may first transmit the two repetitions of the TB on the two consecutive PUSCH transmission occasions (i.e., transmission occasion #0 in slot n and transmission occasion #1 in slot n+1) from CG configuration #0, followed by one repetition of the TB on the one PUSCH transmission occasion (i.e., transmission occasion #2 in slot n+2) from CG configuration #1, followed by two repetitions of the TB on the two consecutive PUSCH transmission occasions (i.e., transmission occasion #3 in slot n+3 and transmission occasion #4 in slot n+4) from CG configuration #2.

After that, the first number of total repetitions included in CG configuration #0 is reached. Therefore, the UE may transmit the remaining repetitions according to an order determined based on CG configuration #1 and CG configuration #2. That is, the UE may transmit one repetition of the TB on the one PUSCH transmission occasion (i.e., transmission occasion #5 in slot n+5) from CG configuration #1, followed by two repetitions of the TB on the two consecutive PUSCH transmission occasions (i.e., transmission occasion #6 in slot n+6 and transmission occasion #7 in slot n+7) from CG configuration #2.

After that, the first number of total repetitions included in CG configuration #2 is reached. Therefore, the UE may transmit the remaining one repetition according to CG configuration #1. That is, the UE may transmit one repetition of the TB on the PUSCH transmission occasion (i.e., transmission occasion #8 in slot n+8) from CG configuration #1.

Referring to FIG. 10, for the nine PUSCH transmission occasions, the start slot of the first PUSCH transmission occasion from a succeeding CG configuration equals to an end slot of the last PUSCH transmission occasion from a preceding CG configuration plus one. For example, the start slot (e.g., slot n+2) of transmission occasion #2 from CG configuration #1 equals to the end slot (e.g., slot n+1) of transmission occasion #1 from CG configuration #0 plus one. Similarly, the start slot (e.g., slot n+3) of transmission occasion #3 from CG configuration #2 equals to the end slot (e.g., slot n+2) of transmission occasion #2 from CG configuration #1 plus one. The same rule may also be applied to remaining PUSCH transmission occasions.

The UE may be configured an SRI in a CG configuration for type 1 CG or may receive an activation DCI including an SRI for type 2 CG. The SRI may indicate one or more SRS resources based on which the UE may determine the PUSCH transmission port, spatial relation, the pathloss reference signal (PL-RS) and so on. For multi-TRP transmission, one or more SRS resource sets may be configured for the UE. Given this, the UE may need to know which SRS resource set is used for which CG configuration.

According to some embodiments of the present application, each CG configuration of the at least two CG configurations may include an SRI. The SRI may include at least one bit indicating an SRS resource set used for transmitting the one or more repetitions of the TB according to the corresponding CG configuration.

According to some other embodiments of the present application, the UE may receive DCI indicating at least one SRI in SRI field, wherein each of the at least one SRI may include at least one bit indicating an SRS resource set used for transmitting the one or more repetitions of the TB according to each CG configuration of the at least two CG configurations.

In an embodiment, the DCI may indicate one SRI, the one SRI may include at least one bit indicating an SRS resource set. After receiving the SRI, the UE may transmit the one or more repetitions of the TB according to the CG configuration activated by the DCI by using the SRS resource(s) in an SRS resource set indicated by at least one bits in the SRI.

In another embodiment, the DCI may indicate two or more SRIs, each of the two or more SRIs may include at least one bits indicating an SRS resource set used for transmitting the one or more repetitions of the TB according to a corresponding CG configuration. For example, for two associated CG configurations, the first SRI indicated by the DCI may indicate an SRS resource set for PUSCH transmission according to a CG configuration with a lower index and the second SRI indicated by the DCI may indicate an SRS resource set for PUSCH transmission according to a CG configuration with a higher index.

For example, it is assumed that two SRS resource sets are configured for the UE. The most significant bit (MSB) of the SRI may be used to distinguish the SRS resource set. For example, the MSB "0" of the SRI may indicate SRS resource(s) in SRS resource set #0, and the MSB "1" of the SRI may indicate SRS resource(s) in SRS resource set #1. In other examples, the least significant bit (LSB) of the SRI may be used to distinguish the SRS resource set.

For example, it is assumed that two SRS resource sets are configured for a UE and each SRS resource set contains two SRS resources. Moreover, two associated CG configurations (e.g., type 1 CG configuration #0 and type 1 CG configuration #1) may be configured for the UE and a codebook based PUSCH is transmitted based on CG configuration #0 and CG configuration #1.

The SRI in each type 1 CG configuration may be five bits. In CG configuration #0, the value of SRI equals to "00000". In CG configuration #1 the value of SRI equals to "10000".

The MSB "0" of SRI in CG configuration #0 may indicate that SRS resource set #0 is used for PUSCH transmission according to CG configuration #0, and remaining four bits "0000" may indicate that the first SRS resource(s) in the SRS resource set #0 used for PUSCH transmission according to CG configuration #0. Accordingly, the UE may transmit one or more repetitions of the TB based on the first SRS resource in SRS resource set #0 and CG configuration #0.

The MSB "1" of SRI in CG configuration #1 may indicate that SRS resource set #1 is used for PUSCH transmission according to CG configuration #1, and remaining four bits "0000" may indicate that the first SRS resource in the SRS resource set #1 used for PUSCH transmission according to CG configuration #1. Accordingly, the UE may transmit one or more repetitions of the TB based on the first SRS resource in SRS resource set #1 and CG configuration #1.

According to some other embodiments of the present application, each CG configuration of the at least two CG configurations may include an SRS resource set index for indicating an SRS resource set used for transmitting the one or more repetitions of the TB according to the corresponding CG configuration.

For type 1 CG, the corresponding SRS resource(s) for transmitting one or more repetitions of a TB according to a CG configuration is determined by the SRI and SRS resource set index configured in the CG configuration.

For type 2 CG, if DCI activates a CG configuration, the corresponding SRS resource(s) for transmitting one or more repetitions of a TB according to the CG configuration may be determined by the SRI indicated in the DCI and SRS resource set index configured in the CG configuration.

In some embodiments, each CG configuration may be presented by a ConfiguredGrantConfig IE as specified in 3GPP standard document TS 38.331. Referring to FIG. 11, it illustrates an exemplary CG configuration IE according to some embodiments of the present application. In FIG. 11, the ConfiguredGrantConfig IE may include a newly added parameter SRS-ResourceSetId which represents an index of an SRS resource set. If an SRS resource set index is not configured, the SRS resource(s) indicated by SRI used for PUSCH transmission according to the CG configuration is in SRS resource set #0.

According to the some other embodiments of the present application, in the case that multiple CORESETs are configured in a serving cell, the parameter CORESET pool index e.g. CORESETPoolIndex in 3GPP standard document TS 38.331) may be configured (to indicate at least one CORESET may be associated with a TRP. In addition, each CORESET pool index may be associated with an SRS resource set by a fixed rule. For example, CORESET pool index #0 is associated with an SRS resource set #0 and CORESET pool index #1 is associated with an SRS resource set #1. In another example, CORESET pool index #0 is associated with an SRS resource set #1 and CORESET pool index #1 is associated with an SRS resource set #0. Given this, each CG configuration could be associated with an SRS resource set implicitly. For type 1 CG, in order to determine the SRS resource set used for a CG configuration, each CG configuration of the at least two CG configurations may include a CORESET pool index. If a CORESET pool index is not configured in a CG configuration, the default value of the CORESET pool index may equal to zero.

In some embodiments, each CG configuration may be presented by a ConfiguredGrantConfig IE as specified in 3GPP standard document TS 38.331. Referring to FIG. 12, it illustrates an exemplary CG configuration IE according to some embodiments of the present application. In FIG. 12, the ConfiguredGrantConfig IE may include a newly added parameter coresetPoolIndex-r16 which represents a CORESET pool index.

For type 2 CG, a CORESETPoolIndex associated with a CG configuration may be implicitly determined by a CORESETPoolIndex configured for a CORESET transmitting DCI activating the CG configuration. The CORESETPoolIndex is associated with an SRS resource set used for transmitting the one or more repetitions of the TB according to the CG configuration by a fixed rule.

For example, it is assumed that three CORESETs are configured in a serving cell, wherein CORESET #0 is configured with a CORESETPoolIndex #0, CORESET #1 and CORESET #2 are configured with a CORESETPoolIndex #1. The CORESETPoolIndex #0 may be associated with SRS resource set #0, and CORESETPoolIndex #1 may be associated with SRS resource set #1.

Moreover, it is assumed that two type 1 CG configurations (e.g., CG configuration #0 and CG configuration #1) are configured for the UE. CG configuration #0 may include CORESETPoolIndex #0 and an SRI with a value “0011”. CG configuration #1 may include CORESETPoolIndex #1 and an SRI with a value “0011”.

After receiving the two CG configurations, the UE may transmit one or more repetitions on one or more PUSCH transmission occasions from CG configuration #0 based on the fourth SRS resource in SRS resource set #0 which associated with CORESETPoolIndex #0, and transmit one or more repetitions on one or more PUSCH transmission occasions from CG configuration #1 based on the fourth SRS resource in SRS resource set #1 which associated with CORESETPoolIndex #1.

In Rel-15/16, a HARQ process ID of a CG based PUSCH transmission is calculated by the formula in section 5.4.1 in TS 38.321, wherein the HARQ process ID is related to the first symbol of a CG based PUSCH transmission. For a TB transmitted towards different TRP according to different CG configurations, the first symbol of each CG configuration may be different due to the TDM transmission scheme. That is, transmitting repetitions of a TB according to different CG configurations may result in different HARQ process IDs. However, the at least two CG configurations for transmitting the same TB should have a same HARQ process ID. Embodiments of the present application may provide several methods to resolve this problem.

According to some embodiments of the present application, the same HARQ process ID for the at least two CG configurations may be determined based on a first symbol of a first PUSCH transmission occasion from a CG configuration with a lowest index among the at least two CG configurations. For example, the first symbol of a first PUSCH transmission occasion from a CG configuration with a lowest index may be input to the formula in section 5.4.1 in TS 38.321 to determine the HARQ process ID.

For type 1 CG, the first symbol may be indicated by a TDRA field in the CG configuration with lowest index. For type 2 CG, the first symbol may be indicated by a TDRA field in the DCI activating the CG configuration with lowest index.

According to some embodiments of the present application, the same HARQ process ID for the at least two CG configurations may be determined based on an earliest start symbol of all PUSCH transmission occasions from the at least two CG configurations. For example, the earliest start symbol may be input to the formula in section 5.4.1 in TS 38.321 to determine the HARQ process ID.

Figure 13:
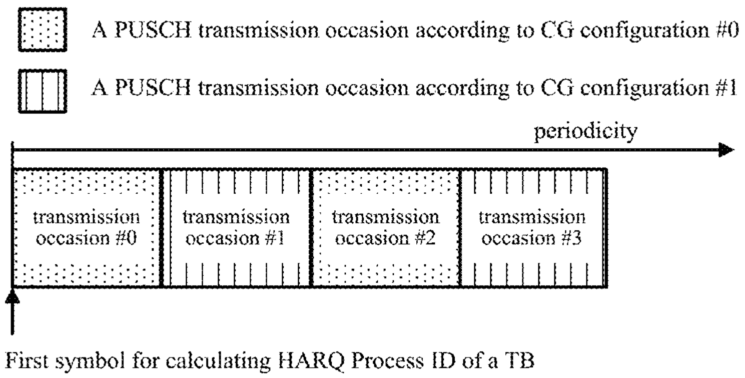
FIG. 13 illustrates yet another exemplary TB transmission on PUSCH transmission occasions from multiple CG configurations according to some other embodiments of the present application.

FIG. 13 illustrates yet another exemplary TB transmission on PUSCH transmission occasions from multiple CG configurations according to some other embodiments of the present application.

Referring to FIG. 13, it is assumed that two type 1 CG configurations, e.g., CG configuration #0 and CG configuration #1, are configured for the UE. Each CG configuration may configure two PUSCH transmission occasions in a periodicity. It is assumed that all PUSCH transmission occasions from the two CG configurations may include transmission occasion #0 (from symbol 2 to symbol 5 in slot n) from CG configuration #0, transmission occasion #1 (from symbol 7 to symbol 10 in slot n) from CG configuration #1, transmission occasion #2 (from symbol 2 to symbol 5 in slot n+1) from CG configuration #0, and transmission occasion #3 (from symbol 7 to symbol 10 in slot n+1) from CG configuration #1. Then, the HARQ Process ID for the TB transmission according to the two CG configurations may be determined based on earliest symbol #2 of all the PUSCH transmission occasions.

According to some other embodiments of the present application, the same HARQ process ID for the at least two CG configurations may be determined to be a lowest HARQ process ID among all HARQ process IDs calculated based on the at least two CG configurations.

In this method, for each CG configuration of the at least two CG configurations, the UE may determine a HARQ process ID according to the formula in section 5.4.1 in TS 38.321. Then, the UE may determine the lowest HARQ process ID among all HARQ process IDs to be used for the least two CG configurations.

For a TB transmitted towards multiple TRPs based on multiple CG configurations, there are some limitations on the associated CG configurations for better supporting this scheme and reducing a UE's complexity.

According to some embodiments, all repetitions of the TB transmitted according to the at least two CG configurations have a same TB size, such that the BS could do a soft combining based on the repetitions of the TB received from multiple TRP.

In an embodiment, the TB size may be determined based on a number of resource blocks (RBs) corresponding to a first PUSCH transmission occasion of all PUSCH transmission occasions from the at least two CG configurations.

In another embodiment, the TB size may be determined based on a number of RBs corresponding to a PUSCH transmission occasion of a CG configuration with a lowest index among the at least two CG configurations. For example, referring to the example in FIG. 13, the TB size may be determined based on the number of RBs in transmission occasion #0.

In yet another embodiment, the TB size may be determined to be a smallest TB size among all TB sizes calculated based on the at least two CG configurations. That is, for each CG configuration, the UE may determine a TB size based on a number of RBs corresponding to a PUSCH transmission occasion from the corresponding CG configuration, and then the UE may determine the smallest TB size among all TB sizes as the TB size for the at least two CG configurations.

According to some embodiments, the at least two CG configurations have a same periodicity and a same number of HARQ processes since the HARQ process ID may be calculated based on them.

According to some embodiments, at least two CG configurations have a same number of transmission layers. The number of transmission layers may be the same as the number of DMRS ports indicated by the antenna ports field in a CG configuration (for type 1 CG) or in a DCI for activating a CG configuration (for type 2 CG). In an embodiment, if the PUSCH is codebook-based transmission, the number of layers for determining the TPMI shall also be same. If the PUSCH is non codebook-based transmission, the number of SRI indicated by SRI field in a CG configuration (for type 1 CG) or in a DCI for activating a CG configuration (for type 2 CG) shall be the same.

Figure 14:
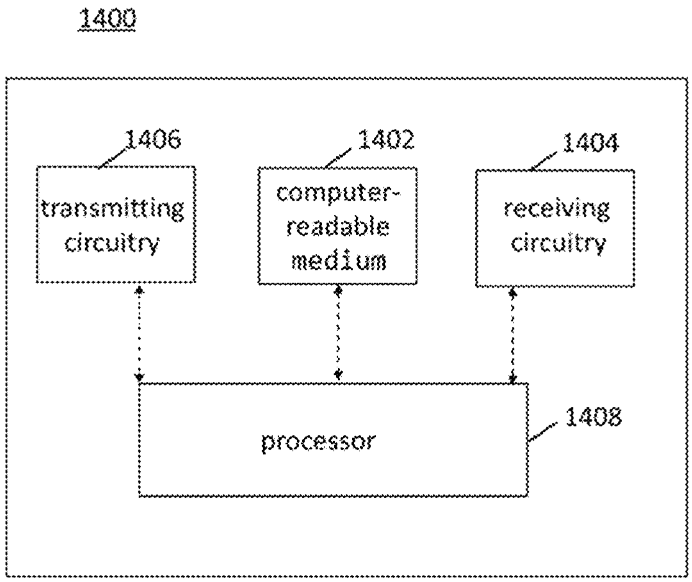
FIG. 14 illustrates a simplified block diagram of an apparatus for multi-TRP transmission according to some embodiments of the present application.

According to some embodiments, the at least two CG configurations have a same priority and a same PUSCH repetition type since the at least two CG configurations are used for transmitting the same TB FIG. 14 illustrates a simplified block diagram of an apparatus for multi-TRP transmission according to some embodiments of the present application. The apparatus 1400 may be a BS 101 or a UE 105 (for example, UE 105*a*, UE 105*b*, or UE 105*c*) as shown in FIG. 1.

Referring to FIG. 14, the apparatus 1400 may include at least one non-transitory computer-readable medium 1402, at least one receiving circuitry 1404, at least one transmitting circuitry 1406, and at least one processor 1408. In some embodiments of the present application, at least one receiving circuitry 1404 and at least one transmitting circuitry 1406 and be integrated into at least one transceiver. The at least one non-transitory computer-readable medium 1402 may have computer executable instructions stored therein. The at least one processor 1408 may be coupled to the at least one non-transitory computer-readable medium 1402, the at least one receiving circuitry 1404 and the at least one transmitting circuitry 1406. The computer executable instructions can be programmed to implement a method with the at least one receiving circuitry 1404, the at least one transmitting circuitry 1406 and the at least one processor 1408. The method can be a method according to an embodiment of the present application, for example, the method shown in FIG. 3.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for multi-TRP transmission, including a processor and a memory. Computer programmable instructions for implementing a method for multi-TRP transmission are stored in the memory, and the processor is configured to perform the computer programmable instructions to implement the method for multi-TRP transmission. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for multi-TRP transmission as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A method performed by a user equipment (UE), the method comprising:

receiving at least two configured grant (CG) configurations in a bandwidth part (BWP), each CG configuration of the at least two CG configurations including a sounding reference signal (SRS) resource set index for indicating an SRS resource set used to transmit one or more repetitions of a transport block (TB) according to a corresponding CG configuration for a first type of CG or a second type of CG;

wherein, for the first type of CG, corresponding SRS resources are determined by an SRS resource indicator (SRI) and the SRS resource set index, the SRI and the SRS resource set index configured in the corresponding CG configuration;

wherein, for the second type of CG, corresponding SRS resources are determined by an SRI indicated in downlink control information (DCI) and the SRS resource set index configured in the corresponding CG configuration, wherein the DCI activates the corresponding CG configuration; and transmitting the one or more repetitions of the TB on one or more physical uplink shared channel (PUSCH) transmission occasions from each CG configuration of the at least two CG configurations based on the SRS resource set.

2. The method of claim 1, wherein one CG configuration of the at least two CG configurations includes an index of a remaining CG configuration of the at least two CG configurations.

3. The method of claim 1, further comprising receiving association information for associating the at least two CG configurations, wherein the association information includes an association CG configuration list containing two or more association states, and each association state includes indexes of the at least two CG configurations.

4. The method of claim 3, further comprising:

receiving the DCI for activating the at least two CG configurations, wherein the DCI includes a hybrid automatic repeat request (HARQ) process number (HPN) which indicates an entry in the association CG configuration list corresponding to the association state.

5. The method of claim 3, wherein the association information is indicated by a medium access control (MAC) control element (CE) command.

6. The method of claim 1, wherein each CG configuration of the at least two CG configurations comprises a slot offset within a periodicity of the at least two CG configurations.

7. The method of claim 1, wherein one or more of the PUSCH transmission occasions from each CG configuration of the at least two CG configurations are concatenated according to an order of CG configuration.

8. The method of claim 1, wherein each CG configuration of the at least two CG configurations includes a first number of consecutive repetitions of the TB transmitted according to a corresponding CG configuration, and at least one CG configuration includes a second number of total repetitions of the TB.

9. The method of claim 1, wherein each CG configuration of the at least two CG configurations includes a first number of total repetitions of the TB transmitted according to a corresponding CG configuration and a second number of consecutive repetitions of the TB transmitted according to the corresponding CG configuration.

10. The method of claim 1, wherein a first time duration for all repetitions of the TB is less than or equal to a second time duration derived by a periodicity of the at least two CG configurations.

11. A user equipment (UE) for wireless communication, comprising:

at least one memory; and at least one processor coupled with the at least one memory and configured to cause the UE to:

receive at least two configured grant (CG) configurations in a bandwidth part (BWP), each CG configuration of the at least two CG configurations including a sounding reference signal (SRS) resource set index for indicating an SRS resource set used to transmit one or more repetitions of a transport block (TB) according to a corresponding CG configuration for a first type of CG or a second type of CG;

wherein, for the first type of CG, corresponding SRS resources are determined by an SRS resource indicator (SRI) and the SRS resource set index, the SRI and the SRS resource set index configured in the corresponding CG configuration;

wherein, for the second type of CG, corresponding SRS resources are determined by an SRI indicated in downlink control information (DCI) and the SRS resource set index configured in the corresponding CG configuration, wherein the DCI activates the corresponding CG configuration; and transmit the one or more repetitions of the TB on one or more physical uplink shared channel (PUSCH) transmission occasions from each CG configuration of the at least two CG configurations based at least in part on the SRS resource set.

12. The UE of claim 11, wherein one CG configuration of the at least two CG configurations includes an index of a remaining CG configuration of the at least two CG configurations.

13. The UE of claim 11, wherein the at least one processor is further configured to cause the UE to receive association information for associating the at least two CG configurations, wherein the association information includes an association CG configuration list containing two or more association states, and each association state includes indexes of the at least two CG configurations.

14. The UE of claim 13, wherein the at least one processor is configured to cause the UE to:

receive the DCI for activating the at least two CG configurations, wherein the DCI includes a hybrid automatic repeat request (HARQ) process number (HPN) which indicates an entry in the association CG configuration list corresponding to the association state.

15. The UE of claim 13, wherein the association information is indicated by a medium access control (MAC) control element (CE) command.

16. The UE of claim 11, wherein each CG configuration of the at least two CG configurations comprises a slot offset within a periodicity of the at least two CG configurations.

17. The UE of claim 11, wherein one or more of the PUSCH transmission occasions from each CG configuration of the at least two CG configurations are concatenated according to an order of CG configuration.

18. The UE of claim 11, wherein each CG configuration of the at least two CG configurations includes a first number of consecutive repetitions of the TB transmitted according to a corresponding CG configuration, and at least one CG configuration includes a second number of total repetitions of the TB.

19. A base station (BS) for wireless communication, comprising:

at least one memory; and at least one processor coupled with the at least one memory and configured to cause the BS to:

transmit at least two configured grant (CG) configurations in a bandwidth part (BWP), each CG configuration of the at least two CG configurations including a sounding reference signal (SRS) resource set index for indicating an SRS resource set used to transmit one or more repetitions of a transport block (TB) according to a corresponding CG configuration for a first type of CG or a second type of CG;

wherein, for the first type of CG, corresponding SRS resources are determined by an SRS resource indicator (SRI) and the SRS resource set index, the SRI and the SRS resource set index configured in the corresponding CG configuration;

wherein, for the second type of CG, corresponding SRS resources are determined by an SRI indicated in downlink control information (DCI) and the SRS resource set index configured in the corresponding CG configuration, wherein the DCI activates the corresponding CG configuration; and receive the one or more repetitions of the TB on one or more physical uplink shared channel (PUSCH) transmission occasions from each CG configuration of the at least two CG configurations based at least in part on the SRS resource set.

20. A method performed by a base station (BS), the method comprising:

transmitting at least two configured grant (CG) configurations in a bandwidth part (BWP), each CG configuration of the at least two CG configurations including a sounding reference signal (SRS) resource set index for indicating an SRS resource set used to transmit one or more repetitions of a transport block (TB) according to a corresponding CG configuration for a first type of CG or a second type of CG;

wherein, for the first type of CG, corresponding SRS resources are determined by an SRS resource indicator (SRI) and the SRS resource set index, the SRI and the SRS resource set index configured in the corresponding CG configuration;

wherein, for the second type of CG, corresponding SRS resources are determined by an SRI indicated in downlink control information (DCI) and the SRS resource set index configured in the corresponding CG configuration, wherein the DCI activates the corresponding CG configuration; and receiving the one or more repetitions of the TB on one or more physical uplink shared channel (PUSCH) transmission occasions from each CG configuration of the at least two CG configurations based at least in part on the SRS resource set.

* * * * *